(12) United States Patent
Trisotto et al.

(10) Patent No.: US 10,507,919 B2
(45) Date of Patent: Dec. 17, 2019

(54) LONGITUDINAL LOCK DEVICE FOR CARGO IN AIRCRAFT, SAFETY TRIGGER FOR LONGITUDINAL LOCK DEVICE

(71) Applicant: EMBRAER S.A., São José dos Campos-SP (BR)

(72) Inventors: Saint Clair Trisotto, São José dos Campos (BR); João Carlos Livoratti, São José dos Campos (BR); Douglas de Moura Germano, São José dos Campos (BR); Mário Sérgio Candelária Bernardes Batista, São José dos Campos (BR); Emanuel das Neves Rosa, São José dos Campos (BR); Fábio Henrique Massuia Dos Santos, São José dos Campos (BR); Reinaldo Sawaguchi Kolososki, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 484 days.

(21) Appl. No.: 15/364,668

(22) Filed: Nov. 30, 2016

(65) Prior Publication Data

US 2017/0197717 A1    Jul. 13, 2017

(30) Foreign Application Priority Data

Jan. 11, 2016 (BR) .............................. 102016000552

(51) Int. Cl.
*B64D 1/10* (2006.01)
*B64D 1/12* (2006.01)
*B64D 1/16* (2006.01)
*B64D 9/00* (2006.01)

(52) U.S. Cl.
CPC .................. *B64D 1/10* (2013.01); *B64D 1/12* (2013.01); *B64D 1/16* (2013.01); *B64D 9/003* (2013.01)

(58) Field of Classification Search
CPC ... B64D 1/10; B64D 1/12; B64D 1/16; B64D 9/003
See application file for complete search history.

(56) References Cited

U.S. PATENT DOCUMENTS

| | | | | |
|---|---|---|---|---|
| 4,161,301 A | * | 7/1979 | Beardsley | ................ B64D 1/10 244/118.3 |
| 2003/0057326 A1 | * | 3/2003 | Medina | .................... B64D 9/00 244/137.1 |

(Continued)

*Primary Examiner* — Rodney A Bonnette
(74) *Attorney, Agent, or Firm* — Nixon & Vanderhye P.C.

(57) ABSTRACT

Longitudinal lock devices for cargo in aircraft having a locking box fastened beneath the floor of an aircraft include a locking latch connectable to the cargo and coupled to a bar mechanism disposed inside the locking box. The locking latch is moveable in a direction towards extraction of the cargo in flight. The bar mechanism is fixed to the locking box and includes a puppet arm articulated on a second pivot wand a puppet follower articulated on a first pivot, whereby each of the pivots is operably fastened to the locking box (9). The puppet arm comprises a cam profile on a face there of which is cooperative with a puppet roller connected to an electro-mechanical actuator linear by means of a drive rod. The articulations moving the bar mechanism responsively determine locked, armed and released positions for the device.

27 Claims, 9 Drawing Sheets

(56) References Cited

U.S. PATENT DOCUMENTS

Figure 1:
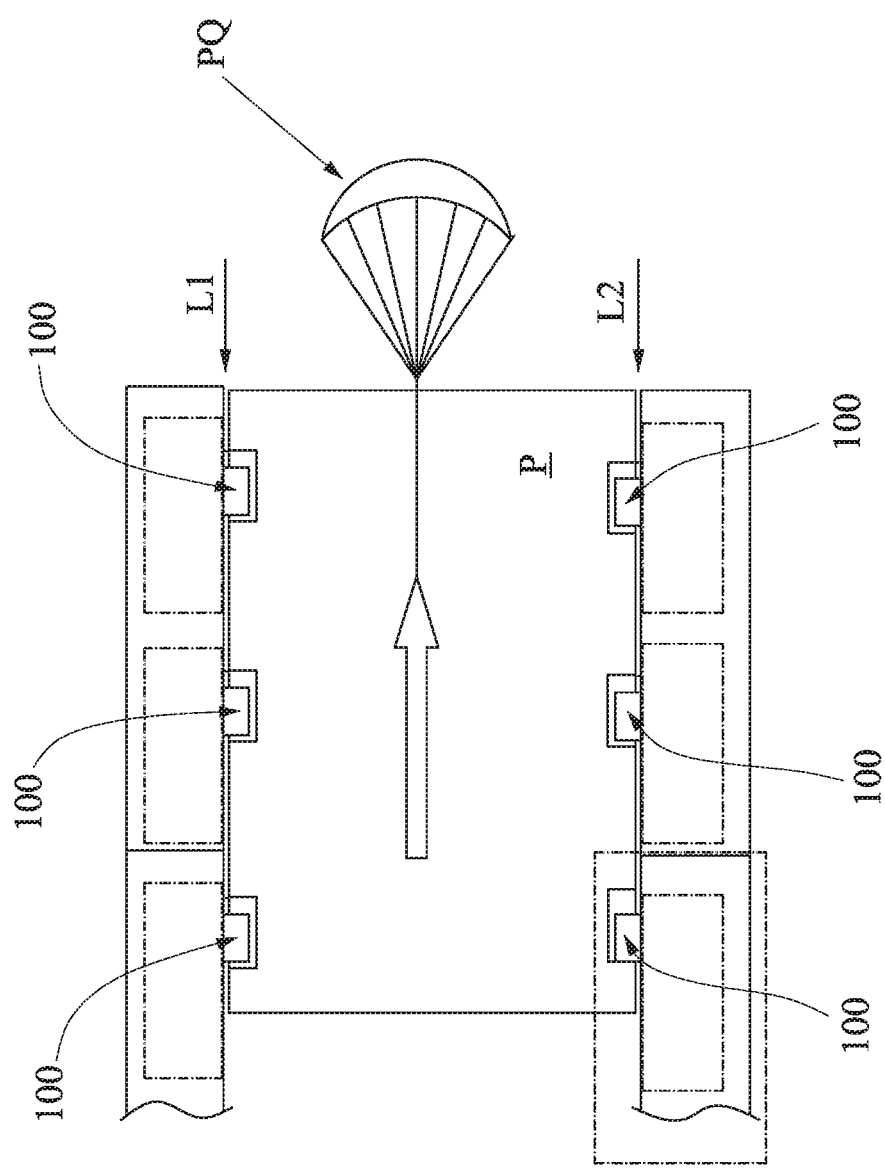

| | | | |
|---|---|---|---|
| 2007/0237598 A1* | 10/2007 | Schulze | B64C 1/20 410/80 |
| 2013/0166063 A1* | 6/2013 | Panzram | B64D 9/00 700/229 |
| 2013/0168494 A1* | 7/2013 | Moradians | B64D 9/003 244/118.1 |

* cited by examiner

LONGITUDINAL LOCK DEVICE FOR CARGO IN AIRCRAFT, SAFETY TRIGGER FOR LONGITUDINAL LOCK DEVICE

This application claims priority to BR Application No. 102016000552-3 filed on Jan. 11, 2016, the entire content of which is hereby incorporated by reference.

The present invention pertains to a longitudinal lock device for cargo in aircraft particularly used in the cargo air drop sequence and logistical transport, and to a safety trigger for longitudinal lock device which mechanically releases the longitudinal lock device when a certain force is attained and a cargo air drop failure is ascertained.

DESCRIPTION OF THE STATE OF THE ART

Certain longitudinal restraint locks used in palletized cargo air drop systems and logistical transport are based on the principle of purely mechanical release when subject to forces originating from the drop platform pulled by the extraction parachute. Mechanical release lock is understood to be a restraint system which based on a certain prescribed displacement of the latch of the lock, corresponding to the release force, unblocks the cargo without an external command action. The mechanical component which relates displacement to the force is a spring, so the longitudinal restriction locks have an internal spring which is activated when the latch of the lock is displaced.

The release force of the lock can be adjusted manually or remotely by way of an electro-mechanical system, as described in document US20120126058 or by a push-pull cable system described in document U.S. Pat. No. 4,379,535, either by varying the pre-tension of the internal spring or by altering the mechanical transmission relationship between the latch of the lock and the displacement of the spring, respectively.

Depending on the state of conservation of the platform, the manufacturing and assembly tolerances, conservation of the locking system and, lastly, of the deflections of the aircraft during the drop process, sometimes the anticipated release of the dropped cargo occurs. The factors cited previously entail a non-uniform loading of the locks which restrain a drop platform. This loading non-uniformity culminates in an effect of sequential release of the locks and, therefore, of the drop platform before the extraction parachute exerts the selected force for releasing the set of locks or when the cargo factors in flight produce inert cargoes on the platforms that are reacted non-uniformly in the locks. The force with which the set of locks is released is arranged individually in the drop locks. When the force from the extraction parachute is greater than the sum of the individual forces in each lock, the locks mechanically release the drop platform with the cargo. The anticipated release of the cargo may occur when the platform is subject to cargo factors in flight or when the extraction parachute is dropped generating a sudden force upon leaving its pack. The consequences of anticipated release of the cargo are the reduction/loss of stability of the aircraft because of the wandering of the center of gravity of the cargo and reduction of precision and accuracy of the delivery site of the cargo.

To assure uniformity of the loading of the locks during the drop, document U.S. Pat. No. 4,379,535 describes a cargo pre-equalization hydraulic system. The drawbacks of this system are the added weight to the aircraft, since it requires the addition of a network of hydraulic pipes that interconnect the locks of the system and the size of the dimensional envelope occupying the aircraft floor.

Document EP0771726 describes an assembly of the locks on a progressive elastic base (urethane elastomer) for better distribution of the cargoes on the locks. However, the elastic base enables the cargo to move lightly during the logistical transport when subject to the cargo factors in flight. This same document proposes a force reading system under the latch of the lock and the electro-mechanical unblocking of the cargo based on a predetermined force value. This electro-mechanical reading and unblocking system prevents the anticipated release of the cargo during the drop, because unblocking the latch depends on the external action of a command (electro-mechanical actuator). However, a simple failure in the electro-mechanical actuator of one of the locks of a set that restrains a platform during the drop may potentially cause a catastrophic event. This is due to the fact that upon detecting that the extraction parachute opened and pulled cargo platform, the system would release all the locks of the set, but a simple failure in one of them would culminate with the retention of the cargo platform inside the aircraft. Accordingly, the aircraft would find itself towing the extraction parachute, whereby generating excessive drag and in turn would reduce speed and potentially stall the aircraft.

OBJECTIVES OF THE INVENTION

The objective of the present invention is to provide a longitudinal lock device for cargo in aircraft used in the cargo drop sequence and logistical transport, the longitudinal lock device being endowed with three operating positions: locked, armed and released and a four-bar mechanism arrangement that facilitates the release of the cargo without the risk of locking.

Another objective of this invention is to provide a safety trigger for a longitudinal lock device which mechanically releases the longitudinal lock device when a certain force is attained and a failure in the cargo drop is ascertained because the longitudinal lock device did not unlock.

BRIEF DESCRIPTION OF THE INVENTION

The object of the present invention is a longitudinal lock device for cargo in aircraft endowed with a locking box which is fastened beneath the floor of an aircraft, the longitudinal lock device for cargo in aircraft comprising a locking latch associated to the cargo and coupled to a bar mechanism disposed inside the locking box, the locking latch being moved towards the extraction of the cargo in flight; the bar mechanism being formed by the locking box acting as a fixed bar, a puppet articulated arm on a second pivot and a puppet articulated follower on a first pivot, both pivots fastened to the locking box; said articulations moving the bar mechanism determining locked, armed and released positions for the device.

A further object of this invention is a safety trigger for longitudinal lock device disposed inside the locking box and comprising a rocker endowed with a contact face and rotatable on a fourth pivot, said rocker being associated to an end of the second compression bar and to an end of an adjustable rod that communicates with the compression helical spring cartridge, the contact face displaces the second compression bar under the action of a longitudinal force applied to the locking latch over a pre-established longitudinal force.

SUMMARIZED DESCRIPTION OF THE DRAWINGS

Figure 2:
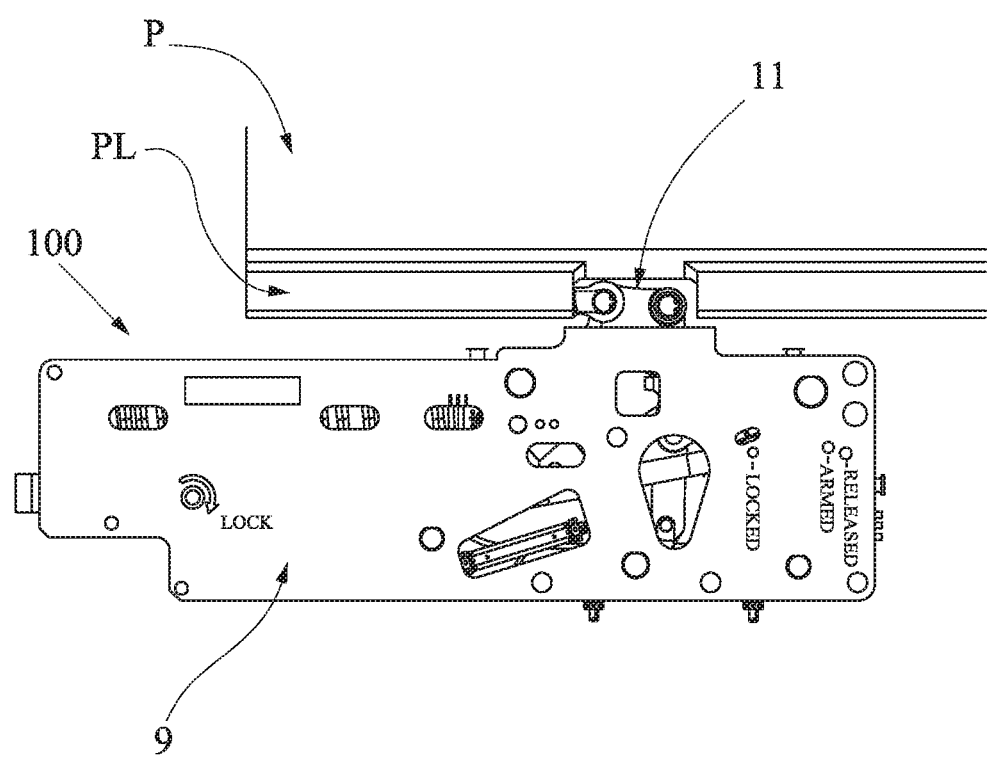
Figure 3A:
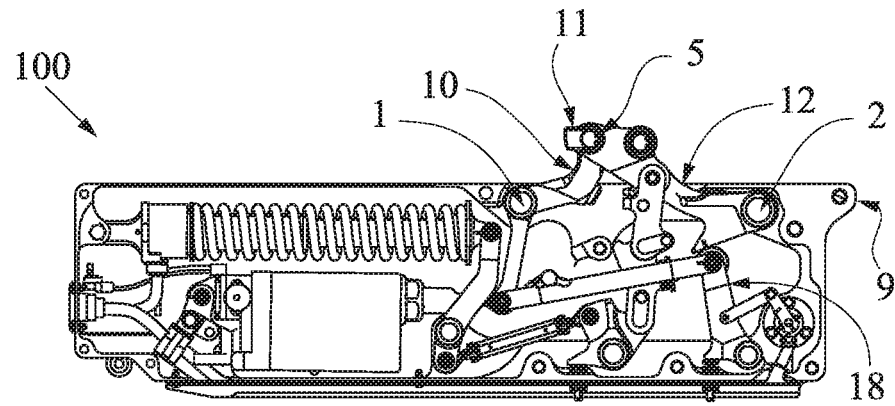
Figure 3B:
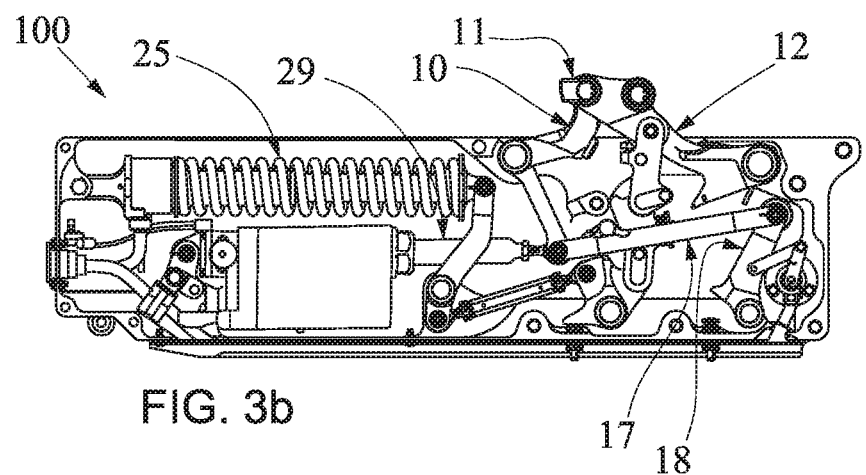
Figure 3C:
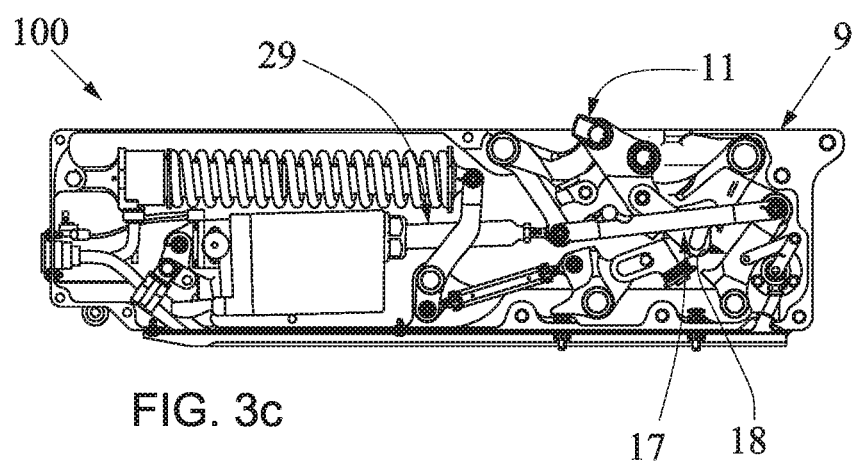
Figure 4:
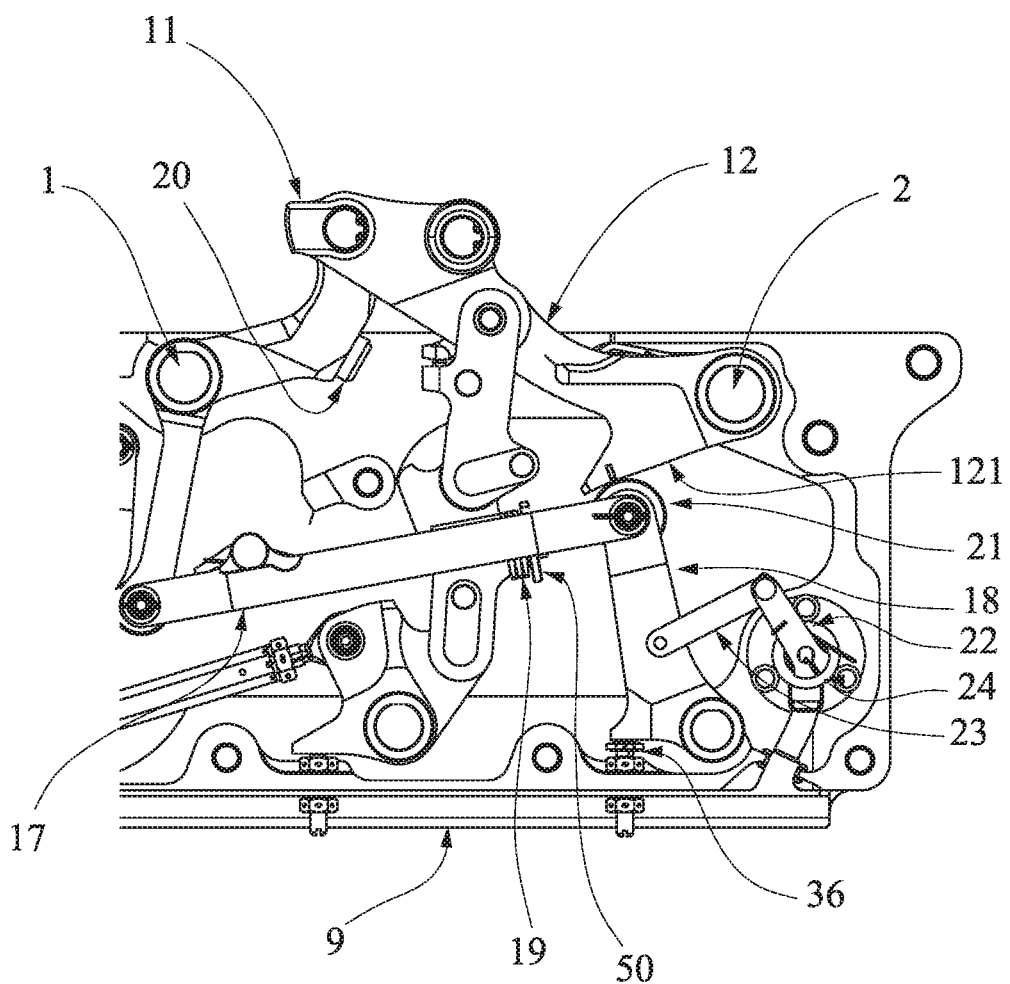
Figure 5:
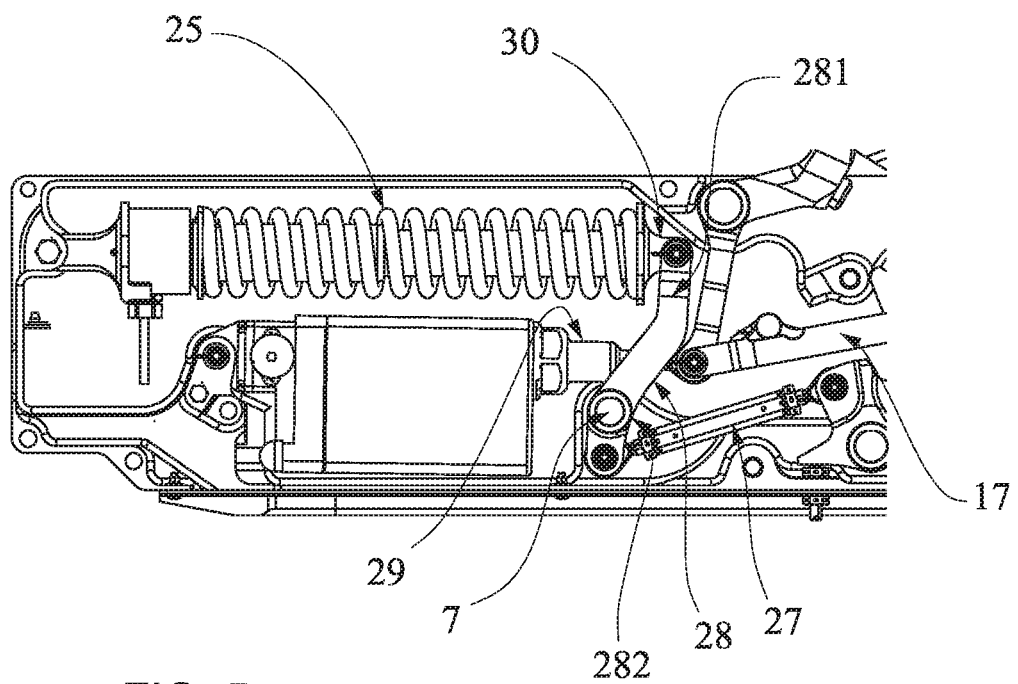
Figure 6:
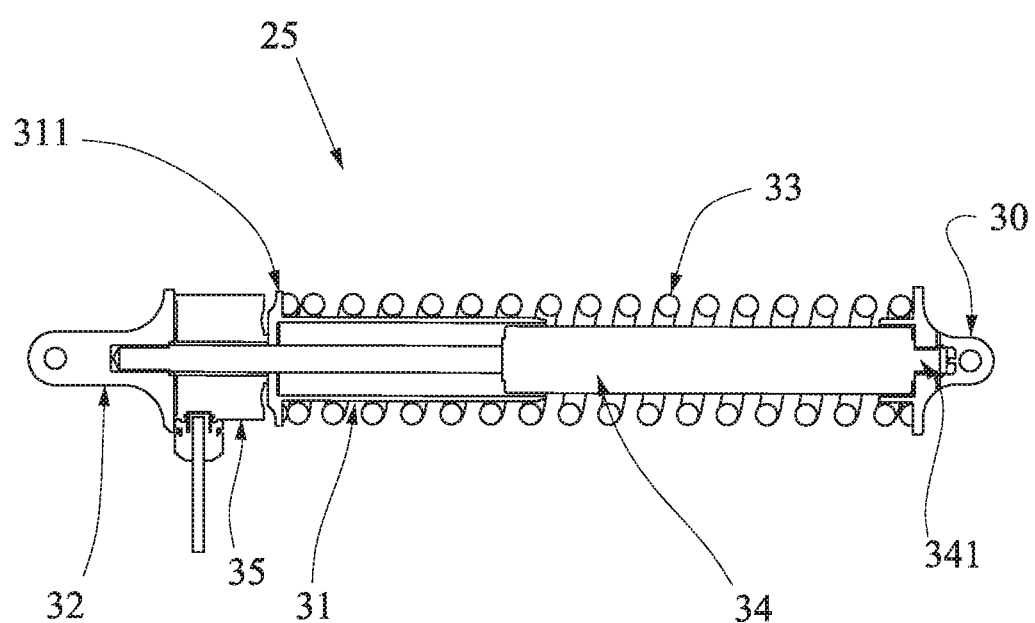
Figure 7A:
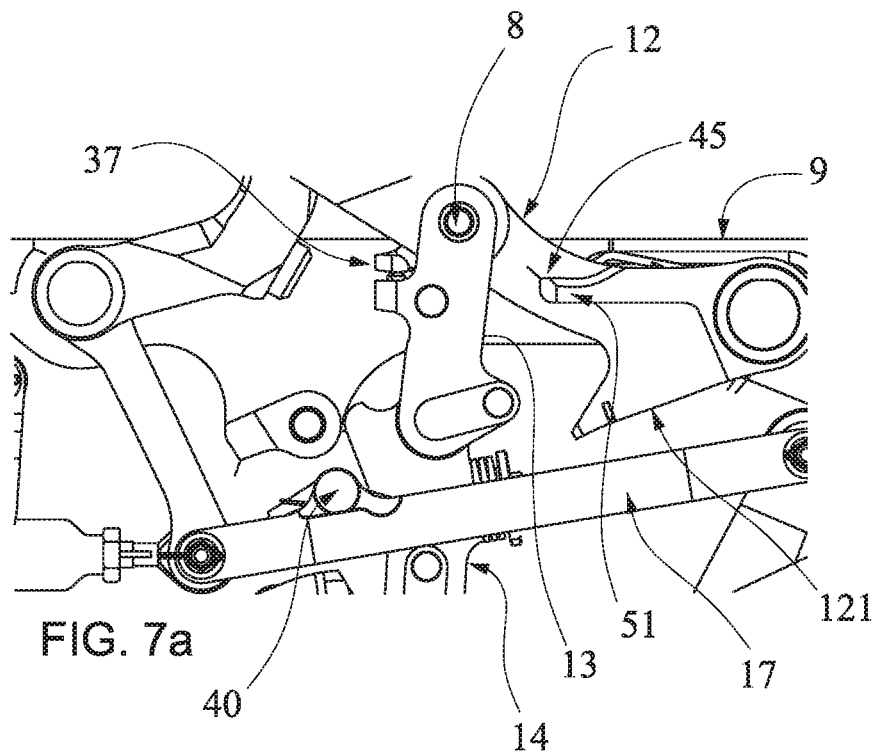
Figure 7B:
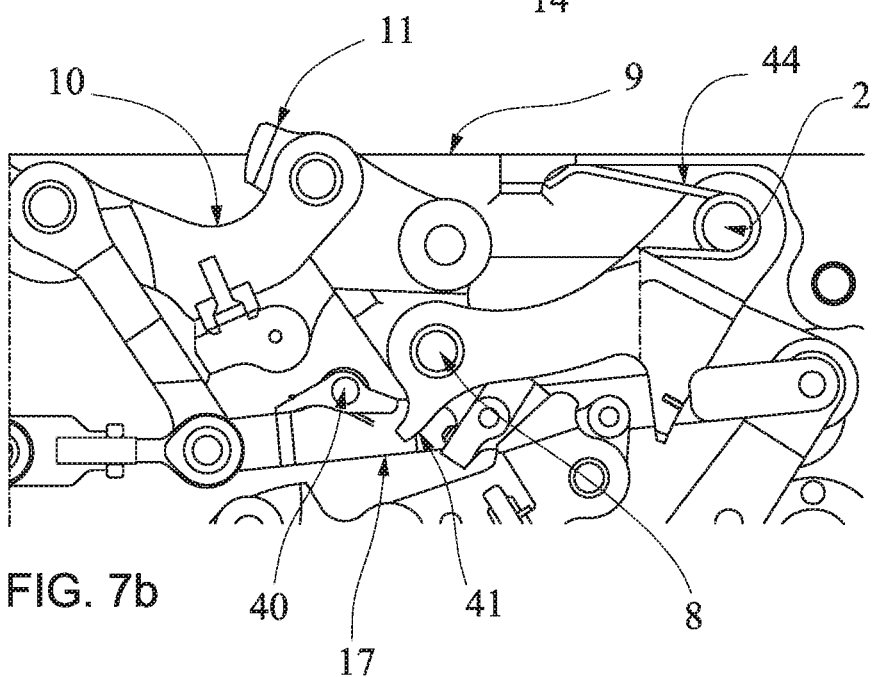
Figure 8:
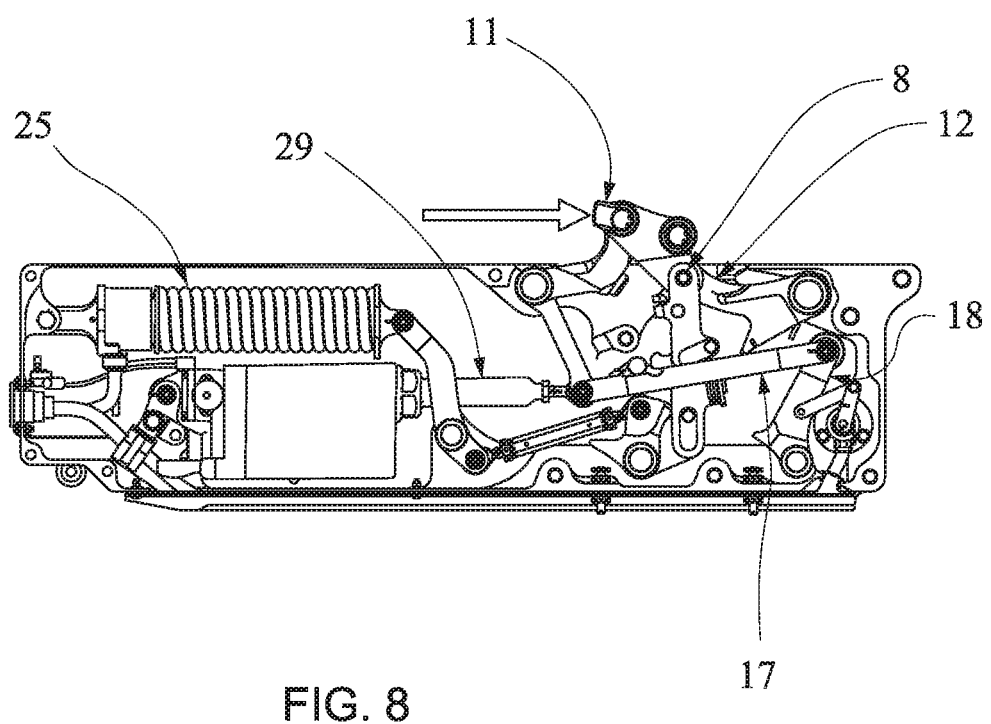
Figure 9:
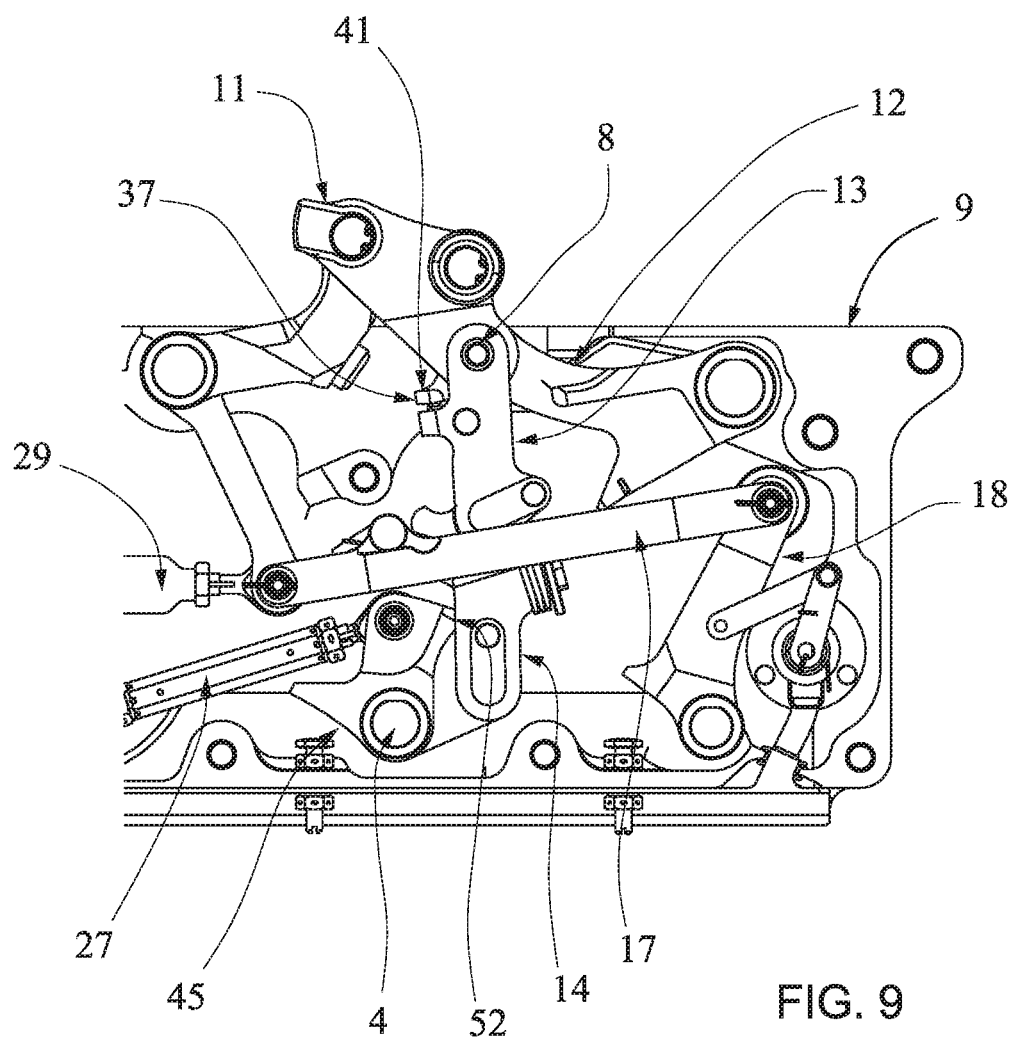

The present invention will now be described in greater detail based on a sample execution represented in the drawings. The drawings show:

FIG. 1—is a schematic view of the longitudinal restraint provided by a plurality of longitudinal lock devices for cargo in aircraft embedded in the cargo handling and extraction procedures in flight;

FIG. 2—is a top view of the longitudinal lock device for cargo in aircraft longitudinally restraining a cargo pallet;

FIGS. 3a, 3b and 3c—are schematic top views of the internal arrangements of the longitudinal lock device for cargo in aircraft in locked, armed and released positions;

FIG. 4—is a first schematic top view with details of the internal arrangement of the longitudinal lock device for cargo in aircraft in locked position;

FIG. 5—is a second schematic top view with details of the internal arrangement of the longitudinal lock device for cargo in aircraft in locked position;

FIG. 6—is a schematic sectional view with details of the spring cartridge comprised in the longitudinal lock device for cargo in aircraft;

FIGS. 7a and 7b—is a top view of localized details of the internal arrangement of the longitudinal lock device for cargo in aircraft in armed and released positions;

FIG. 8—is a general top sectional view of the internal arrangement of the longitudinal lock device for cargo in aircraft in armed position when the longitudinal force under the locking latch attains the point of mechanical release by the safety trigger for longitudinal lock device that is the object of this invention; and FIG. 9—is a top view of localized details of the internal arrangement of the longitudinal lock device for cargo in aircraft in the imminence of mechanical release of the locking latch by the safety trigger for longitudinal lock device.

DETAILED DESCRIPTION OF THE INVENTION

According to a preferred embodiment and as can be seen in the drawings, the present invention pertains to a longitudinal lock device 100 for cargo in aircraft (not shown), preferably a cargo aircraft.

As illustrated in FIG. 1, the cargo aircraft comprises a P platform where the cargoes are disposed, usually on pallets. These cargoes are fastened longitudinally on the P platform until their time for drop during the flight, usually by extraction of PQ parachute.

Until their time for drop, the cargoes longitudinally on the platform of the cargo aircraft are fastened by a plurality of longitudinal lock devices 100 for cargo according to the embodiments of this invention which are preferably disposed in an embedded manner in the floor of the platform P and next to the longitudinal sides L1 and L2 of the platform P.

FIG. 2 illustrates the longitudinal lock device 100 for cargo in an aircraft positioned so as to lock the cargo by means of the association of a locking latch 11 to the pallet PL on which the cargo is disposed. More specifically, a locking box 9 of the longitudinal lock device 100 is fastened beneath the floor of the cargo aircraft and has the function of restraining and longitudinally releasing palletized cargoes. The floor (not illustrated) is hidden becoming a lateral and vertical guide for the pallet PL and the locking box 9 which is embedded therein. This locking box 9 can be installed on both sides of the aircraft symmetrically along the platform P, in an amount that may vary from one pair to a plurality of pairs positioned symmetrically.

The longitudinal lock device 100 for cargo in an aircraft 100 according to an embodiment of this invention comprises a locking latch 11 associated to the cargo and coupled to a bar mechanism disposed inside the locking box 9. The locking latch 11 is moved towards the extraction of the cargo in flight.

The locking latch 11 acts as a coupling bar to the bar mechanism. The bar mechanism, in turn, is formed by the locking box 9 acting as a fixed bar, a puppet articulated arm 12 and rotating on a second pivot 2 and a puppet articulated follower 10 and rotating on a first pivot 1. At the opposite ends to the first and second pivots 1, 2, the puppet arm 12 and the puppet follower 10 connect to the locking latch 11 or coupling bar, closing the chain of bars. Both pivots 1, 2 are fastened to the locking box 9 and the articulations move the bar mechanism determining locked, armed and released positions for the device 100, as illustrated in FIGS. 3a, 3b and 3c.

In locked position (FIG. 3a), which will be described in detail ahead, the bar mechanism attains a position where the angle between the locking latch 11 and the puppet arm 12 is just a few degrees short of the alignment of 180 degrees. This position presents a rather efficient cargo path to react to the locking forces since its configuration is like a triangular trellis with its vertexes located on the first and second pivots 1, 2 and on the fifth pivot 5 of the locking latch 11 and of the puppet follower 10. Additionally, the position of this arrangement provides a strong mechanical reduction for the elastic restraint system in armed mode (FIG. 3b). Another characteristic of the bar mechanism is that the movement of the locking latch 11 during the course of the release of the cargo is always towards the extraction of cargo in flight so as to prevent any type of jamming of the palletized cargo during the release. Thus, when the extraction PQ parachute pulls the cargo out of the aircraft and the lock is commanded to the release position (FIG. 3c), the cargo retroacts the latch 11 backwards until it fully releases the passage of the extraction platform.

As can be seen in detail in FIG. 4, the puppet arm 12 comprises a cam profile 121 on its face, said cam profile 121 is cooperative with a puppet roller 18 which is connected to an electro-mechanical actuator linear 29 (FIG. 5) by means of a drive rod 17 (FIGS. 4 and 5). The linear movement of the electro-mechanical actuator linear 29 moves the puppet roller 18 determining the locked, armed and released positions for the lock device 100.

Locked Position

In locked position illustrated in FIG. 3a and in FIG. 4, the contact region 21 of the puppet roller 18 is kept associated to the cam profile 121 of the puppet arm 12 by a contact force.

More specifically, the rod of the electro-mechanical actuator linear 29 is retracted and the puppet roller 18 is touching the region of the cam profile 121 of the puppet arm 12 near its end. The contact region of the puppet roller 18 guarantees the locking with irreversibility of the bar mechanism of the locking latch 11. This irreversibility is given by the contact force between the cam profile 121 and the contact region 21 which does not tend to rotate the puppet roller 18 to the release position of the mechanism, in a clockwise direction, when a backward longitudinal force pressures the locking latch 11.

The puppet roller 18 is kept in this position by the mechanical connection of the linear actuator 29 and also by a helical torsion spring 39 associated to the puppet roller 18. The helical torsion spring 39 keeps the puppet roller 18 nuzzled at a travel stopper 36 disposed on the locking box 9, near the end of the puppet roller 18 opposite the contact region 21.

The puppet roller 18, the helical torsion spring 39 and the travel stopper 36 comprise a restraint means of the lock device 100 because it keeps the position integrity of the locking latch 11 while the locked position for the device 100 is chosen even under adverse operating conditions.

When a longitudinal force acts on the locking latch 11 in the opposite direction to the direction of the cargo drop (FIG. 7*a*), a stopper arm 51 of the puppet arm 12 nuzzles at a fixed stopper 45 of the locking box 9, restricting the degree of freedom of the bar mechanism in a clockwise direction of this puppet arm 12. This is the largest loading condition of the device 100, since it restraints the mass of the palletized cargo multiplied by the forward cargo factor during emergency landing of the aircraft, for example. In this condition the cam profile 121 of the puppet arm 12 loses contact with the puppet roller 18 momentaneously.

Armed Position

FIGS. 3*b*, 8 and 9 illustrate the longitudinal lock device for aircraft cargo 100 in armed position.

In this armed position, the electro-mechanical actuator linear 29 is extended to an intermediary position, leading the drive rod 17 to rotate the puppet roller 18 in a clockwise direction.

This movement releases the puppet arm 12 of the restraint means of the lock device 100, enabling the puppet arm 12 to rotate in an anti-clockwise position when a backward longitudinal force is reacted by the locking latch 11. Preferably, this movement of the electro-mechanical actuator linear 29 to the armed position releases the puppet arm 12 from contact with the puppet roller 18.

A third pivot 8 is disposed on the locking box 9, between the lock latch 11 and the puppet arm 12. This third pivot 8 is linked to a compression helical spring cartridge 25 by way of a set of rods.

When the third pivot 8 moves inside the locking box 9, the set of bars drives the compression of the helical spring cartridge 25, generating a resistance to this movement. This condition enables the locking latch 11 to have a longitudinal fluctuation from an increasingly digressive-behaving backward force.

As can be seen in FIG. 6, the compression helical spring cartridge 25 comprises a hydraulic buffer 34 axially linked to a flanged guide 31, a mobile terminal 30 linked to a first end 341 of the hydraulic buffer 34, a spring 33 which externally envelops the hydraulic buffer 34 and a flanged guide 31 and a cargo cell 35 disposed axially associated to a flanged end 311 of the flanged guide 31 and to a fixed terminal 32 fixed to the locking box 9.

The compression of the helical spring cartridge 25 is produced by the rotation of a lever of the spring 28 in an anti-clockwise direction when it is pulled by an adjustable rod 27 of the set of bars, as illustrated in FIG. 5. The lever of the spring 28 comprises a first end 281 connected to the mobile terminal 30 of the compression helical spring cartridge 25 and a second end 282 connected to a fourth pivot 7 fixed to the locking box 9.

A flanged guide 31 centralizes the spring 33 by linear movement of the hydraulic buffer 34 inwardly of the flanged guide 31 and outwardly of the flanged guide 31. Accordingly, the flanged guide 31 transmits the compression force of the spring 33 to the cargo cell 35 which, in turn, transmits compression data of the spring 33 to a control box which relays this compression data of the spring 33 to a central computer (not illustrated).

The central computer, by means of a theory function, correlates the compression data of the spring 33 with a longitudinal force applied to the locking latch 11. Based on the set of data, the central computer takes the decision to release the cargo when the sum attains a predetermined value.

Each lock is then commanded from armed position to release position by extension of the rod of the linear actuator 29.

Released Position

When the electro-mechanical actuator linear 29 is extended from the intermediary position to the end, the drive rod 17 advances over the bar mechanism rotating the puppet roller 18 to the released position of the lock device 100.

As can be seen in FIGS. 3*c* and 7*b*, in released position the locking latch 11 is fully retracted into the locking box 9, releasing the palletized cargo.

The longitudinal lock device 100 for aircraft cargo further comprises a neutral system which consists of a first compression bar 13 substantially aligned to a second compression bar 14 and which pushes the bar mechanism of the device 100, squeezing the compression helical spring cartridge 25 (FIG. 9).

The first compression bar 13 is associated to the third pivot 8 and comprises an adjustable screw 37 cooperatively in contact with a stopper 41 of the puppet arm 12, preventing the compression bar 13 from rotating in a clockwise direction and, therefore, preventing the collapse in this direction and keeping the neutral intact.

As illustrated in FIGS. 7*a* and 7*b*, a drive rod 17 comprises a precursor 40 which displaces a second compression bar 14 when a drive rod 17 is moved by extension of the electro-mechanical actuator linear 29. The displacement of the second compression bar 14 is the result of a compression force which traverses the first and second bars under compression 13, 14 and generates momentum in the third pivot 8, making the adjustable screw 37 lose contact with the stopper 41 of the puppet arm 12 leading to the collapse of neutral.

Additionally, the displacement of the second compression bar 14 and the momentum in the third pivot 8 generate a rotation of the first compression bar 13 in an anti-clockwise direction and the locking latch 11 is fully retracted into the locking box 9.

A helical torsion spring 44 is associated to the second pivot 2 and helps the retraction movement of the locking latch 11 inwardly of the locking box 9.

The bar mechanism of the locking latch attains its fully retracted position when the puppet follower 10 comes into contact with the locking box 9. This position is maintained by action of the torsion spring 44 and also by the overlapping of the precursor 40 under the stopper of the puppet arm 12, restricting its clockwise movement.

Simultaneously to the collapse movement of the bars system, the compression load transmitted to the spring cartridges is suddenly removed. Therefore, the compression spring 33 extends, releasing the potential elastic energy stored therein. This energy is dissipated through the hydraulic buffer 34 which cushions the extension speed of the spring by the passage of hydraulic fluid through a calibrated orifice. This Newtonian cushioning occurs only in the extension of the buffer 34 when the spring 33 is relaxed.

A simple failure event in a linear actuator 29 of one of the longitudinal lock devices 100 which longitudinally restrain a cargo extraction platform would result in the retention of the cargo platform inside the aircraft.

In this situation, the aircraft would find itself towing the extraction parachute, whereby generating excessive drag and in turn would reduce speed and potentially stall the aircraft.

To avoid this sequence of events, the longitudinal lock device 100, in armed position, releases the bar mechanism of the locking latch 11 based on the identification of a longitudinal force previously established and less than an extraction force of the cargo.

This safety attribute consists of a safety trigger for longitudinal lock device 100, also object of the present invention, which, as stated, mechanically releases the longitudinal lock device 100 when a certain force is attained and a cargo drop failure is ascertained because of the longitudinal lock device 100 failing to unlock. Preferably, the device 100 mechanically releases a locking latch 11 in armed mode based on a longitudinal force between 4000 and 4400 lbs, more specifically based on a backward longitudinal force of about 4350 lbs, enabling the cargo to move outwardly of the aircraft without longitudinal restraint. This longitudinal force is less than the extraction force of the parachute, so the cargo is not restrained inside the aircraft because the failed lock mechanically releases the platform when the force of the parachute is reacted totally thereby.

According to FIG. 9, the safety trigger is disposed inside the locking box 9 and comprises a rocker 45 endowed with a contact face 52 and rotatable on a sixth pivot 4. This rocker 45 is associated to the end of the second compression bar 14 and to an end of the adjustable rod 27 that communicates with the compression helical spring cartridge 25.

When a longitudinal force applied to the locking latch 11 is over a pre-established longitudinal force, the locking latch 11 deflects the bar mechanism up to a prescribed value. The contact face 52 then comes into contact with a second compression bar 14 and displaces this second compression bar 14 pushing it towards the collapse.

With the collapse of the neutral, the lock device 100 is mechanically led to the released position, that is, the locking latch 11 is retracted into the locking box 9 and the cargo is released. A rubber 20 cushions the impact of the locking latch 11 under the locking box 9.

When the lock device 100 is commanded back to the locked position, a rod of the linear actuator 29 is retracted, releasing the stopper 41 of the puppet arm 12 of the precursor 40 and simultaneously rotates the puppet roller 18 in an anti-clockwise direction. The puppet roller 18 leads the puppet arm 12 through the cam profile 121 up to locked position, where the restraint means keeps the bar mechanism of the locking latch 11 in irreversible locking position. The first and second bars under compression 13 and 14 return to the neutral position by movement of the puppet arm 12 and the contact between the adjustable screw 37 and the stopper 41 of this puppet arm 12 is remade by way of pressure on the face of the drive rod 17 under the face 50 of the elastic stopper 19 of the lower bar under compression 14. The elastic stopper 19 is comprised of a stack of Belleville springs which guarantee a permanent restoration force from the port point of the bars 13 and 14 while in locked position.

The locking box 9 has a monitoring system by way of discrete and continuous sensors located inside the box 9. A hall effect rotary 24 (FIG. 6) monitors the angular position of the restraint means of the lock by way of a mechanical connection 22, 23 and provides information to the dedicated control box.

Having described a preferred sample embodiment, it must be understood that the scope of the present invention encompasses other possible variations, being limited solely by the content of the accompanying claims, potential equivalents included therein.

The invention claimed is:

1. A longitudinal lock device for cargo in aircraft endowed with a locking box which is fastened beneath a floor of the aircraft, wherein the longitudinal lock device comprises:
   a bar mechanism disposed inside the locking box;
   a locking latch capable of being operatively connected to the cargo and coupled to the bar mechanism disposed inside the locking box, the locking latch being moveable in a direction towards extraction of the cargo in flight; wherein
   the bar mechanism is formed by the locking box acting as a fixed bar and includes a puppet arm capable of articulation about a second pivot and a puppet follower capable of articulation about a first pivot, wherein the first and second pivots are fastened to the locking box such that articulations of the puppet arm and the puppet follower move the bar mechanism to determine locked, armed and released positions for the lock device, and wherein the device further comprises
   an electro-mechanical linear actuator having a drive rod, and a puppet roller operatively connected to the drive rod, wherein the puppet arm comprises a cam profile on a face thereof which is cooperative with a contact region of the puppet roller connected to the drive rod of the electro-mechanical linear actuator.

2. The longitudinal lock device as claimed in claim 1, wherein linear movement of the drive rod of the electro-mechanical actuator linear operably moves the puppet roller to responsively determine the locked, armed and released positions for the lock device.

3. The longitudinal lock device as claimed in claim 2, wherein in the locked position the contact region of the puppet roller is maintained in operative contact with the cam profile of the puppet arm by a contact force.

4. The longitudinal lock device as claimed in claim 3, wherein the locking box includes a travel stopper, and wherein the device further comprises a torsion helical spring operatively associated with the puppet roller, wherein the torsion helical spring maintains the puppet roller in seated relationship to the travel stopper disposed on the locking box.

5. The longitudinal lock device as claimed in claim 4, wherein the contact force and the torsion helical spring prevent the rotation of the puppet roller to the armed and released positions.

6. The longitudinal lock device as claimed in claim 5, wherein the puppet roller, the torsion helical spring and the travel stopper comprise a lock restraint which maintains positional integrity of the locking latch.

7. The longitudinal lock device as claimed in claim 2, wherein the drive rod rotates the puppet roller to the armed position when the electro-mechanical actuator linear is extended to an intermediary position.

8. The longitudinal lock device as claimed in claim 7, wherein the puppet arm is free of contact with the puppet roller when the lock device is in the armed position.

9. The longitudinal lock device as claimed in claim 8, further comprising a third pivot disposed on the locking box between the lock latch and the puppet arm, a compression helical spring cartridge, and a set of rods linking the third pivot to the compression helical spring cartridge.

10. The longitudinal lock device as claimed in claim 9, wherein the compression helical spring cartridge comprises a flanged guide, a hydraulic buffer axially linked to the flanged guide, a mobile terminal linked to a first end of the hydraulic buffer, a spring which externally envelops the hydraulic buffer and the flanged guide, and a cargo cell which is axially associated to a flanged end of the flanged guide and to a fixed terminal.

11. The longitudinal lock device as claimed in claim 10, wherein the flanged guide centralizes the spring based on a linear movement of hydraulic buffer inwardly of the flanged guide and outwardly of the flanged guide.

12. The longitudinal lock device as claimed in claim 10, wherein the flanged guide transmits compression force of the spring to the cargo cell.

13. The longitudinal lock device as claimed in claim 12, further comprising a control box, wherein the cargo cell transmits compression data of the spring to a control box which relays the compression data of the spring to a central computer.

14. The longitudinal lock device as claimed in claim 13, wherein the central computer correlates the compression data of the spring with a longitudinal force applied to the locking latch, releasing the cargo when a sum attains a predetermined value.

15. The longitudinal lock device as claimed in claim 10, wherein the fixed terminal is fixed to the locking box.

16. The longitudinal lock device as claimed in claim 9, further comprising substantially aligned first and second compression bars which push the bar mechanism when under compression thereby squeezing the compression helical spring cartridge.

17. The longitudinal lock device as claimed in claim 16, wherein the first compression bar is associated to the third pivot and comprises an adjustable screw cooperatively in contact with a stopper of the puppet arm.

18. The longitudinal lock device as claimed in claim 17, wherein the drive rod comprises a precursor for displacing the second compression bar when the drive rod is moved by extension of the electro-mechanical actuator linear.

19. The longitudinal lock device as claimed in claim 18, wherein displacement of the second compression bar generates momentum in the third pivot such that the adjustable screw loses contact with the stopper of the puppet arm.

20. The longitudinal lock device as claimed in claim 19, wherein displacement of the second compression bar generates a rotation of the first compression bar in an anti-clockwise direction to thereby cause the locking latch to be totally retracted into the locking box.

21. The longitudinal lock device as claimed in claim 20, further comprising a helical torsion spring associated to the second pivot for assisting in retraction movement of the locking latch inwardly of the locking box.

22. The longitudinal lock device as claimed in claim 2, wherein the drive rod rotates the puppet roller to the released position when the electro-mechanical linear actuator is extended from an intermediary position to a final position.

23. The longitudinal lock device as claimed in claim 22, wherein the locking latch is fully retracted into the locking box when the lock device is in the released position.

24. A safety trigger for the longitudinal lock device as claimed in claim 1, wherein the safety trigger is disposed inside the locking box and comprises:
 a rocker endowed with a contact face and being rotatable on a fourth pivot, and
 a compression helical spring cartridge, wherein the rocker is associated to an end of a second compression bar and to an end of an adjustable rod that communicates with the compression helical spring cartridge, and wherein the contact face of the rocker displaces the second compression bar under action of a longitudinal force applied to the locking latch over a pre-established longitudinal force.

25. The safety trigger as claimed in claim 24, wherein the longitudinal force applied to the locking latch deflects the bar mechanism and nuzzles the contact face on the compression bar.

26. The safety trigger as claimed in claim 25, wherein the safety trigger mechanically releases the locking latch in an armed mode by identifying a longitudinal force previously established and less than an extraction force of the cargo.

27. The safety trigger as claimed in claim 26, wherein the safety trigger mechanically releases the locking latch in an armed mode by a longitudinal force between 4000 and 4400 lbs.

* * * * *